April 16, 1935.  F. R. BISHOP  1,998,070
OPHTHALMIC MOUNTING
Filed Dec. 8, 1932
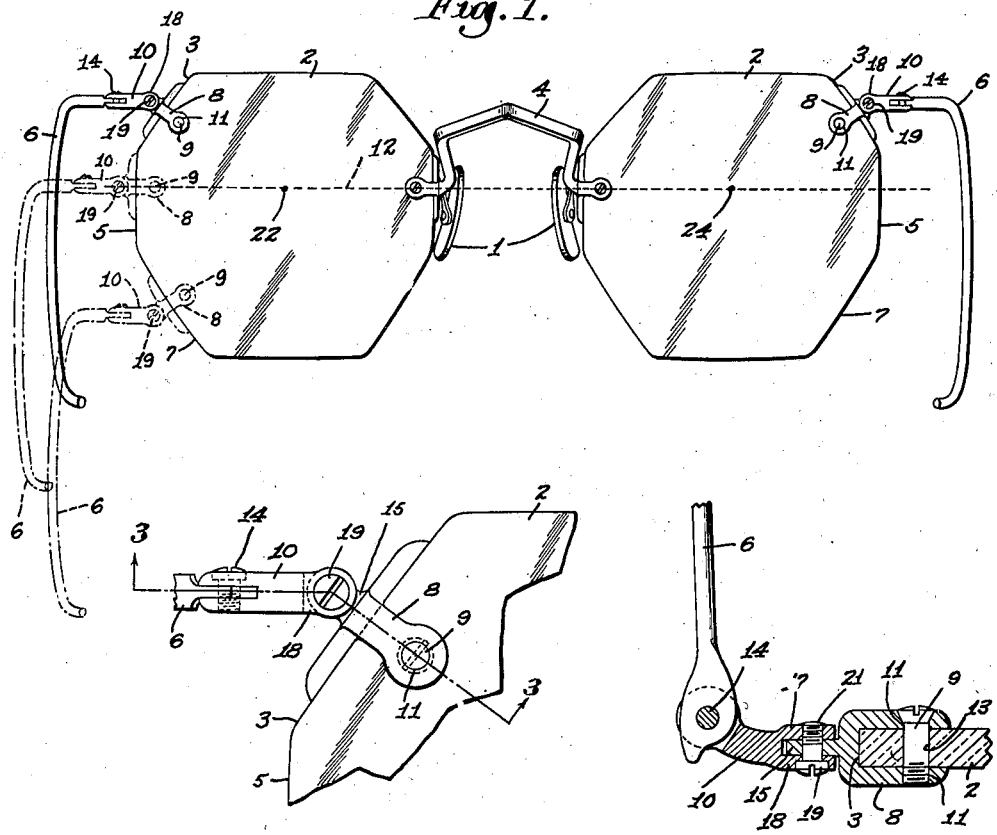
Inventor
Frederick R. Bishop
by [signature]
Attorney Patented Apr. 16, 1935

1,998,070

UNITED STATES PATENT OFFICE 1,998,070

OPHTHALMIC MOUNTING

Frederick Rice Bishop, North Attleboro, Mass., assignor to The Bishop Company, North Attleboro, Mass., a corporation of Massachusetts Application December 8, 1932, Serial No. 646,271

5 Claims. (Cl. 88—53)

The present invention relates to ophthalmic mountings, and more particularly to end pieces. From a more limited aspect, the invention relates to temple-end-piece connections, and more especially to connections of this character for mountings of the rimless type.

Temple end pieces of the above-described character are usually designed so as to be joined to a particular, fixed point along the periphery of the lens. As this periphery is ordinarily not straight, the temple would swing in a different plane if the end piece were fixed at some other point of the lens. It is therefore impracticable to adjust the end piece along the lens periphery. When, for example, it is desired to have the temples swing in the horizontal plane through the centers of the lenses, therefore, it is necessary to employ end pieces suitably designed for such purposes. When it is desired to raise the temples above the centers of the lenses, or to position them at any other point, it is necessary to use other, suitably designed end pieces.

An object of the invention, therefore, is to improve upon ophthalmic mountings of the above-described character.

A further object is to improve upon end-piece constructions.

Another object is to render it possible to secure the same end piece adjustably at different points of a lens periphery.

Other and further objects will be explained hereinafter, and will be particularly pointed out in the appended claims.

The invention will be described in connection with the accompanying drawing, in which Fig. 1 is a front elevation of an ophthalmic mounting embodying the present invention, the temple end piece being shown by dotted lines in different positions; Fig. 2 is an enlarged fragmentary view of the same; and Fig. 3 is a section taken upon the line 3—3 of Fig. 2, looking in the directions of the arrows.

The illustrated spectacles are provided with two lenses 2, a bridge 4 connecting the lenses, and temples 6 pivoted to two-part end pieces 8, 10. The bridge may be of the type (not shown) that is adapted to rest directly on the wearer's nose, or that is raised out of contact with the nose, as illustrated in Fig. 1, rocking guards 1 being provided at each end of and below the bridge 4, to engage against the sides of the nose. The lenses 2 are shown octagonal in shape, thus providing an irregular periphery 3, 5 and 7 in substantially an up-and-down direction when the mounting is worn in normal position upon a wearer's face. The irregular periphery may, of course, be provided in other ways, as by curving or otherwise irregularly shaping the lens boundaries. The temples 6 may be lowered or raised with respect to the lenses 2, as desired, by adjusting the temple end pieces 8, 10 substantially up and down along the irregular periphery 3, 5, 7, thus to adjust the mounting easily to the wearer's particular, facial characteristics. The temple end pieces may be secured in adjusted position along the irregular periphery 3, 5, 7, by screws 9 passing through openings 11 in the part 8 of the two-part end piece and openings 13 in the lens 2.

The part 8 is in the form of a lens-holding clamp and the temple 6 is pivoted to the part 10 by a screw or pintle 14. The part 8 is provided with a tongue 15 that extends between two arms 17 and 18 of the part 10. A screw 19, that extends through the arms 18 and 17 and the tongue 15, acts as a pivot about which the two parts 8 and 10 may pivot with respect to each other. The screw 19 is shown extending freely through the arm 18 and the tongue 15 and threaded into the arm 17. The free end 21 of the screw 19 may be headed over, if desired, as it will not, ordinarily, be necessary to separate the parts 8 and 10.

The part 8 may occupy any desired position on the periphery 3, 5, 7 of the lens, one such position being shown in full lines and two in dotted lines. The pivot screw 19, being disposed substantially perpendicular to the plane of the lens 2, the part 10 may be swung thereabout to adjust its direction of extension in substantially the plane of this lens. As illustrated in Fig. 1, it is usually desirable to have the part 10 extend horizontally in parallel directions from the lens 2 in all positions of adjustment along the periphery 3, 5, 7. The temple 6 will thus swing in substantially the same, common, parallel, horizontal planes in all the corresponding positions of adjustment of the end piece along the irregular peripheries 3, 5, 7 of the two lenses 2. In some cases, however, depending upon the needs of the particular patient, it may be desirable to adjust the two two-part end pieces 8, 10 so that one temple shall be above the other. The screw 19 will be provided with sufficient tension to hold the part 10 in such suitably adjusted position with respect to the part 8. If any tendency of the parts 8 and 10 to wobble with respect to each other should develop, it would merely be necessary to tighten the screw 19. The parts 8 and 10 may thus be caused to bear snugly against each other, without looseness.

As spectacles are ordinarily constructed, the temple end pieces are disposed along the dotted line 12 that passes substantially through the centers 22 and 24 of the lenses 2. In some types of spectacles, however, as illustrated by full lines, the end pieces are raised substantially above this line 12, in order that the eyes of the wearer may have unobstructed vision to the right and to the left, under the temples 6. According to the present invention, both these positions, as well as other positions, such as is illustrated by the lowermost, dotted-line position of Fig. 1, are possible of attainment with the same end pieces. In all cases, therefore, the spectacle frame will be exactly "on line" when it is trued up, thus preventing the lenses from being tipped out of alinement or focus or out of adjustment.

The temples 6, however, may, if desired, be caused to slope downward, towards the wearer's ears, so as to pivot in a plane or planes inclined to the plane of the lenses. In that event, it may be desirable to have the end-piece part 10 suitably inclined with respect to the part 8, to correspond.

Modifications will occur to persons skilled in the art and all such are considered to fall within the spirit and scope of the invention as defined in the appended claims:

What is claimed is:

1. An ophthalmic mounting comprising two lenses having irregular peripheries, a bridge connecting the lenses, a temple for each lens, means for securing the temples in adjusted positions along the peripheries of the lenses, means for causing the temples to swing in substantially a common plane when the temples occupy corresponding adjusted positions along the peripheries of the lenses, and means for positively preventing the temples from moving substantially outside of the said plane.

2. A two-part end piece for an ophthalmic mounting, a lens-holding clamp and a temple connected with the respective parts, means for securing the clamp in selected positions along the periphery of the lens, a member extending into the parts in a direction substantially at right angles to the plane of the lens and acting as a pivot about which one of the parts is restricted to swing adjustably with respect to the other part in substantially the plane of the lens and substantially at right angles to the said member, and means cooperating with the member to secure the parts positively in pivotally adjusted position to prevent accidental movement of the said parts out of the pivotally adjusted position.

3. A two-part end piece for an ophthalmic mounting, a lens-holding clamp and a temple connected with the respective parts, means for securing the clamp in selected positions along the periphery of the lens one of the parts having two arms substantially parallel to the plane of the lens on opposite sides of the plane of the lens, the other part having a tongue extending between the two arms substantially in the plane of the lens, and a screw extending into the arms and the tongue in a direction substantially at right angles to the plane of the lens, whereby one of the parts is pivotally restricted to swing adjustably with respect to the other part in substantially the plane of the lens and substantially at right angles to the screw, the arms and the tongue bearing against one another to prevent substantial movement of the said parts outside the said plane, the screw being adapted to be tightened to cause the tongue to be held snugly between the arms, thus to secure the parts positively in pivotally adjusted position to prevent accidental movement of the said parts out of the pivotally adjusted position.

4. An ophthalmic mounting comprising two lenses and a bridge connecting the lenses, a two-part temple end piece for each lens, one of the parts of each two-part end piece having means for adjustably holding a lens, a temple joined to the other part of each two-part end piece, means for securing the said one part in selected positions along the periphery of the corresponding lens, the two parts of each two-part end piece being pivotally restricted to swing adjustably with respect to each other in substantially the plane of the corresponding lens, and means for positively securing the parts in pivotally adjusted positions to prevent accidental movement of the parts out of the pivotally adjusted positions.

5. An ophthalmic mounting comprising a two-part temple end piece, one of the parts having means for holding a lens, a temple joined to the other part, means for securing the said one part in selected positions along the periphery of the lens, and means for hingedly connecting said other part to said first-named part for adjustable movement restricted to substantially the plane of the lens and for fixing said other part in hingedly adjusted position.

FREDERICK R. BISHOP.